Dec. 18, 1962 H. E. SWEENEY ETAL 3,069,679
MULTIPLEX COMMUNICATION SYSTEMS
Filed April 22, 1959 3 Sheets-Sheet 1
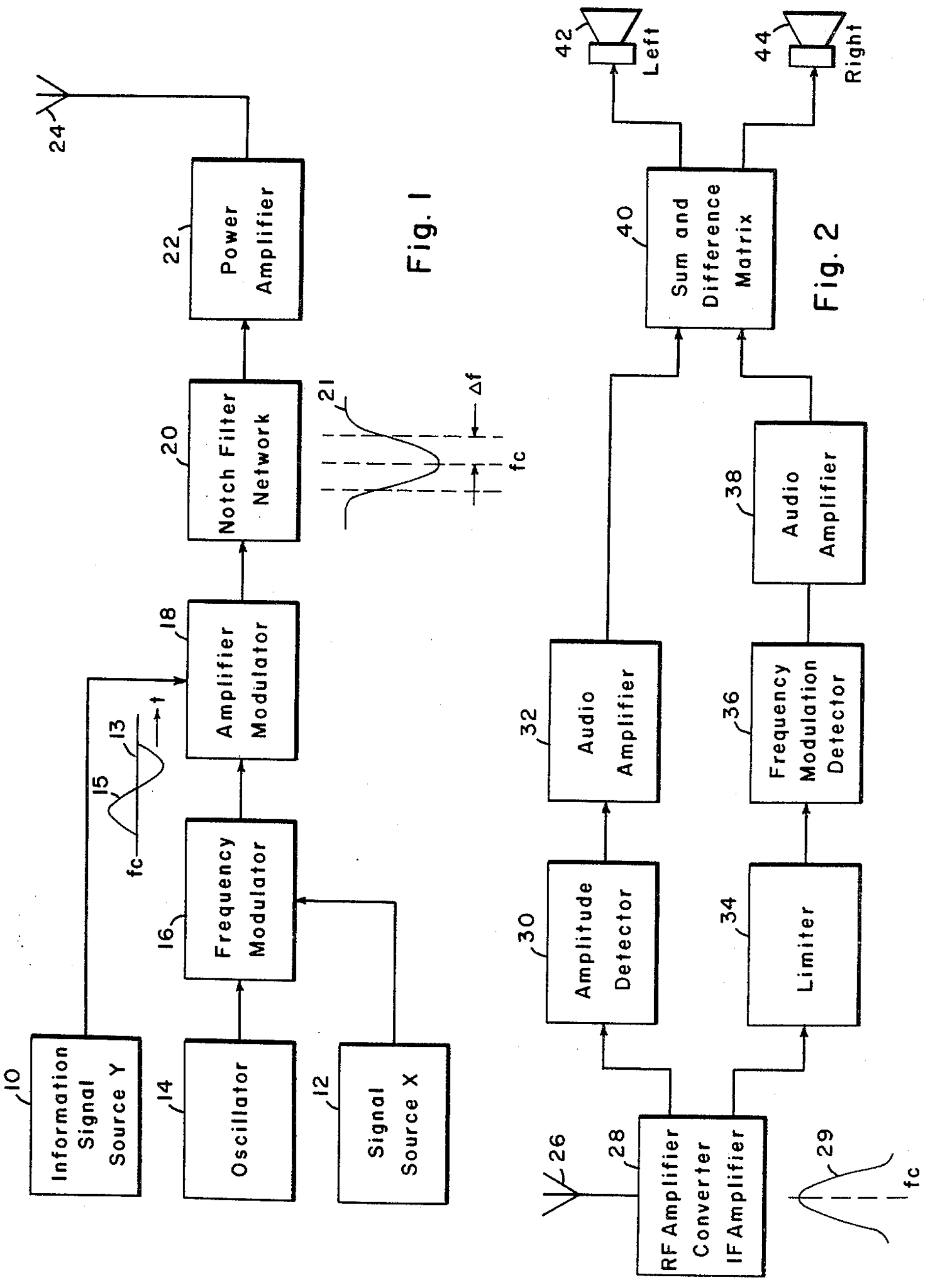
Fig. I, Fig. 2
WITNESSES
John E. Heasley, Jr.
James F. Young
INVENTORS
Harold E. Sweeney &
Charles W. Baugh, Jr
BY
Benjamin De Witt
ATTORNEY Dec. 18, 1962 H. E. SWEENEY ETAL 3,069,679

MULTIPLEX COMMUNICATION SYSTEMS

Filed April 22, 1959

3 Sheets-Sheet 2

3,069,679

MULTIPLEX COMMUNICATION SYSTEMS

Harold E. Sweeney, Plainfield, and Charles W. Baugh, Jr., Montgomery Township, N.J., assignors to Westinghouse Electric Corporation, East Pittsburgh, Pa., a corporation of Pennsylvania Filed Apr. 22, 1959, Ser. No. 808,038
10 Claims. (Cl. 343—200)

The present invention relates generally to multiplex radio communication systems and more particularly to systems for simultaneous transmission of two signals as separate modulations of a single carrier and for reception of such signals at a remote location without undesirable interference therebetween.

The present invention finds one particularly advantageous application in radio transmission of stereophonic sound signals. In ordinary radio systems, sound from a single microphone is transmitted over a single radio channel having a frequency bandwidth of about 9 to 10 kilocycles. In such systems, audio perspective is entirely lost since the amplitude difference, time delay and phase displacement between the sounds received by the two ears of the listener bears no relationship to what happens at the microphone which feeds the transmitter. Stereophonic transmisison and reception has heretofore been demonstrated using two microphones, set up at locations on each side of a stage on which an orchestra, for example, may be situated. Each microphone is connected by a separate radio channel to one of two loudspeakers placed similarly as were the microphones, but in a listening chamber where the receiving apparatus is situated. By such previously demonstrated arrangements, an auditory effect may be obtained which is substantially the same as though the orchestra or other source of sound were actually located in front of the listener rather than the sound being reproduced by the loudspeakers.

In applying sterophonic sound concepts to radio communication, one very serious obstacle is the need for two separate channels for the transmission of a single entertainment program. That obstacle has heretofore prohibited commercial stereo transmission in the AM broadcast band. To receive commercial acceptance, any broadcast band stereophonic transmission system must conform to the requirement that all signals outside a single frequency band of about 9 kilocycles bandwidth should, by international agreement, be attenuated so that broadcast transmitters in adjacent channels are not disturbed. Desirable solutions to the problem would permit transmission of both audio channels over the same carrier frequency, thereby using but one radio channel and reducing to a minimum the additional investment required at the transmitter as well as the additional investment required by prospective listeners.

One proposed system using a single channel is described in detail in "Electronics Magazine," issue of February 1941, at pages 34 to 36. That system suggests transmission of the audio signal from a first microphone as amplitude modulation and that from a second microphone as phase modulation of the same carrier. Such a system has the disadvantage that a conventional receiver will reproduce the signal from the first microphone only. Thus, a conventional AM receiver would produce sound signals corresponding to those heard at one end of a stage on which the orchestra is located. A primary requisite of a genuinely compatible system is that a conventional receiver should produce balanced monophonic sounds substantially corresponding to the sound effects which would be heard by a listener seated near the center of the studio in which the orchestra is located. Another disadvantage of the above-mentioned amplitude and phase modulation system is that phase modulation necessarily requires a greater bandwidth in order to produce the same signal to noise figure. That is, if phase modulation is used, the frequency deviation of the carrier signal increases as the frequency of the audio modulation increases. Accordingly, if the available bandwidth were fully utilized at low modulation frequencies, then it would be exceeded at the higher frequency audio modulations. If the available bandwidth were fully utilized at the maximum audio modulation frequencies, then it is not exploited at the lowest modulation frequencies and the signal to noise ratio would suffer. Thus phase modulation systems are practically incompatible for use in the amplitude modulation broadcast band.

In another prior art stereophonic transmission system, signals A and B from spaced microphones are transmitted by adding the signals and transmitting the resulting sum signal $A+B$ as frequency modulation of a carrier and simultaneously subtracting the signals and transmitting the difference signal $A-B$ as frequency modulation of a supersonic subcarrier in the same channel. At the receiver, the two signals after processing by different circuits, are respectively demodulated and then (1) added to produce the first audio signal A, and (2) algebraically subtracted to produce the second audio signal. The "sum and difference signal" concept used by that system has the advantage that a single receiver tuned to the $A+B$ channel will provide normal monophonic sound reproduction. However, such a system has the important disadvantage of requiring a bandwidth of several tens of kilocycles to simultaneously accommodate the main frequency modulated carrier and also the supersonic subcarrier. It is not suitable for use in the AM broadcast band where bandwidth is restricted by international agreement to approximately 10 kilocycles. Accordingly, such a system would be usable commercially only in the present FM broadcast bands or in other high frequency bands and would not provide compatible monophonic reception by means of conventional AM broadcast receivers. In addition, the last-mentioned system requires circuitry of special design and considerable expense for stereophonic reception of the subcarrier signal.

Accordingly, a primary object of the present invention is to provide a transmission system affording compatible reception of monophonic sound for listeners having conventional AM broadcast band receivers and simultaneously providing stereophonic reception for listeners having receivers in accordance with the invention.

It is a different primary object of the present invention to provide a system for transmission of a plurality of intelligence bearing signals, wherein one of the signals is utilized to amplitude modulate a carrier and another signal is utilized to angle modulate the same carrier.

It is another object of the present invention to provide a multiplex communication system for more efficiently utilizing radio frequency channels wherein first and second signals respectively modulate a single carrier in amplitude and frequency respectively, and wherein predistortion of one of the modulations is provided to substantially compensate for distortion which would otherwise occur in the process of detection of said one modulation by means of a conventional receiver.

It is a further object of the invention to provide a multiplex radio communication system in which first and second signals are transmitted simultaneously as amplitude and frequency modulation respectively of a single carrier wave and in which signal components are provided to precorrect the transmitted modulation for distortion expected to occur in the receiver.

It is an additional object of the present invention to provide a system of communication wherein first and second separate signals are transmitted simultaneously by frequency modulation and by amplitude modulation respectively of the same carrier and wherein the amplitude modulation is modified before transmission in accordance with a distortion compensating signal which corresponds inversely to the amplitude distortion expected at the receiver whereby conventional amplitude modulation receivers can reproduce said first signal without interference from the frequency modulation.

It is a still further object of the present invention to provide, inter alia, a stereophonic transmitter apparatus for use in the conventional AM broadcast band which apparatus may be constructed by addition of inexpensive auxiliary components to an existing broadcast band amplitude modulation transmitter.

Other general objects of the present invention are to provide an improved stereophonic sound radio transmission system, to apply the foregoing objects to such stereophonic systems, and to provide for compatible reception of monophonic sound by listeners who are not equipped with special stereophonic receiving equipment.

Briefly described, the present invention transmits a plurality of information bearing signals on a single communication channel by adding the signals and transmitting the summation as amplitude modulation and subtracting the signals and transmitting the resulting difference signal as frequency modulation of the same carrier. In specific application to stereophonic sound transmission, instead of transmitting the output of one microphone over one channel and the output of the other microphone over the other channel, the sum of the outputs of the two microphones is transmitted as amplitude modulation and the difference of the outputs is transmitted as frequency modulation of the same carrier. In a preferred embodiment the difference signal is filtered prior to application to the transmitter so that only audio signals substantially within the range of 300 cycles to 3000 cycles are transmitted. Such transmission enables a conventional AM receiver tuned to the transmitter carrier, to reproduce a sum signal $A+B$ which contains equal components of the signal from each microphone and therefore represents balanced monophonic sound.

For stereophonic reception, a special receiver is provided which requires only an amplitude limiter and a frequency detector in addition to the conventional circuits of a standard amplitude modulation broadcast band receiver. The $A+B$ signal from the conventional amplitude detector and the $A-B$ signal from the frequency detector are matrixed by known sum and difference producing circuits to reproduce the sound signals A and B separately. In the system of the present invention as thus far described, one particular problem of note arises: If it be considered for the moment that there is no amplitude modulation and only an FM modulation, such as would occur when A and B are equal and out of phase, it is seen that the frequency selective circuits of a conventional receiver will modulate the amplitude of the received FM signal. More precisely, as the frequency modulated carrier sweeps across the receiver passband from one extreme frequency deviation to the other extreme frequency deviation, it will encounter portions of the receiver passband having varying gains. Accordingly, the output of the frequency selective network of the receiver will be amplitude modulated as a function of the absolute frequency deviation of the carrier signal from its center frequency. This spurious amplitude modulation appears in the signal applied to the amplitude detector as frequency-amplitude distortion or cross-talk into the $A+B$ channel. To overcome the foregoing cross-talk problem, the present invention provides precorrector means at the transmitter to insert an amplitude modulation component of sufficient amplitude and character to substantially counteract that which is expected to occur in the frequency selective network of an average AM receiver.

The foregoing and other objects and features of the present invention will be apparent from the following description taken with the accompanying drawing, throughout which like reference characters indicate like parts, which drawing forms a part of this application, and in which:

FIG. 1 is a functional block diagram of a radio transmitter arranged in accordance with the present invention;

FIG. 2 is a functional block diagram of a radio receiver arranged to receive and demodulate the signals transmitted by the transmitter illustrated in FIG. 1;

Figure 3:
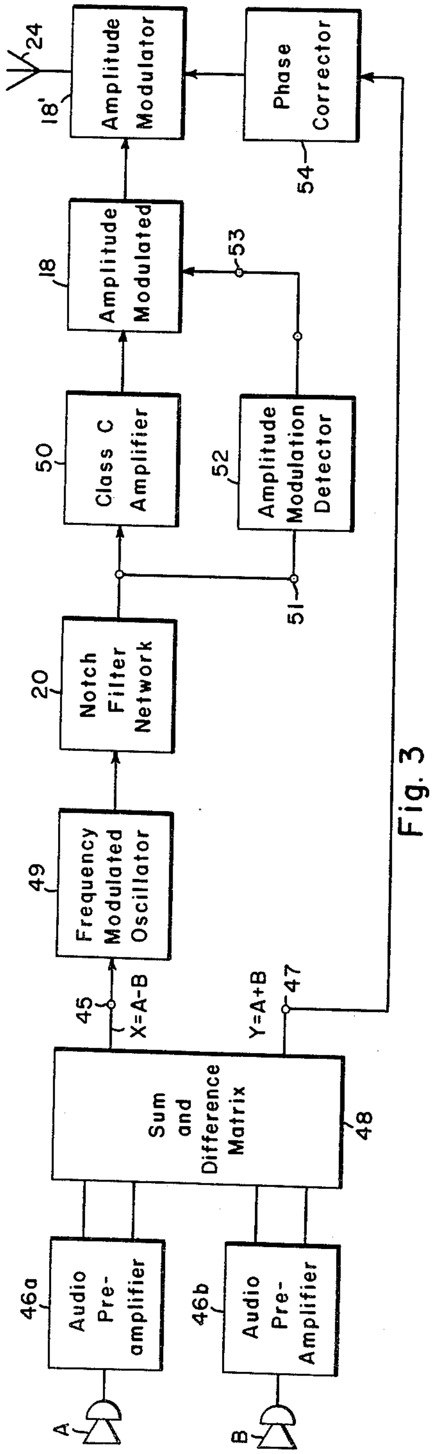
FIG. 3 is a functional block diagram of a modification of the transmitter illustrated in FIG. 1.

Referring now more specifically to FIG. 1 of the drawings, the reference numeral 10 denotes a source of modulation signal, which may be denominated intelligence signal "Y." The modulation signal Y provided by source 10 is applied to an amplitude modulator 18 which may comprise, for example, circuits of conventional character commonly used in transmitting stations for applying amplitude modulation to carrier waves. Reference numeral 12 denotes a second source of modulation signal, which may be denominated intelligence signal "X." The signal X from source 12 is applied to a frequency modulation system 14, 16 of conventional character which may include the frequency oscillator 14 and a balanced modulator circuit 16 which circuits are known per se. Alternatively, the frequency modulation system may comprise an oscillator associated with a reactance tube for varying the frequency of the oscillator in accordance with the signal from source 12. The frequency modulated carrier wave from frequency modulator 16 is applied to amplitude modulator 18 and is amplitude modulated by the signal from signal source 10. The resulting amplitude and frequency modulated signal is applied to a notch filter network 20 having a frequency response characteristic generally as shown by curve 21. As shown by curve 21, network 20 operates on a carrier wave to attenuate the carrier frequency to a greater extent when it is near the center frequency $f_c$ of the oscillator 14 than when it is deviated to a maximum deviation $\Delta f$. That variable attenuation characteristic of the network 20 provides amplitude modulation of the carrier wave in accordance with a positive function of the absolute deviation of the instantaneous carrier frequency from the center frequency $f_c$. The resulting carrier wave, amplitude modulated in accordance with the signal Y plus the correction signal, and frequency modulated by the signal X is applied from the output of network 20 to the input of a conventional linear power amplifier 22 and thence to an antenna 24 which radiates the signal in conventional manner. The radiated carrier signal thus includes frequency modulation components corresponding to the signal from source 12, amplitude modulation corresponding to the signal Y from source 10, and a further amplitude modulation predistortion component supplied by the action of network 20. The radiated carrier may have a nominal or center frequency $f_c$ of, for example, 1000 kilocycles. The carrier frequency deviation $\Delta f$ is preferably limited to plus and minus 3 kilocycles. The amplitude modulation of the carrier signal is preferably limited to approximately 95%.

Figure 4:
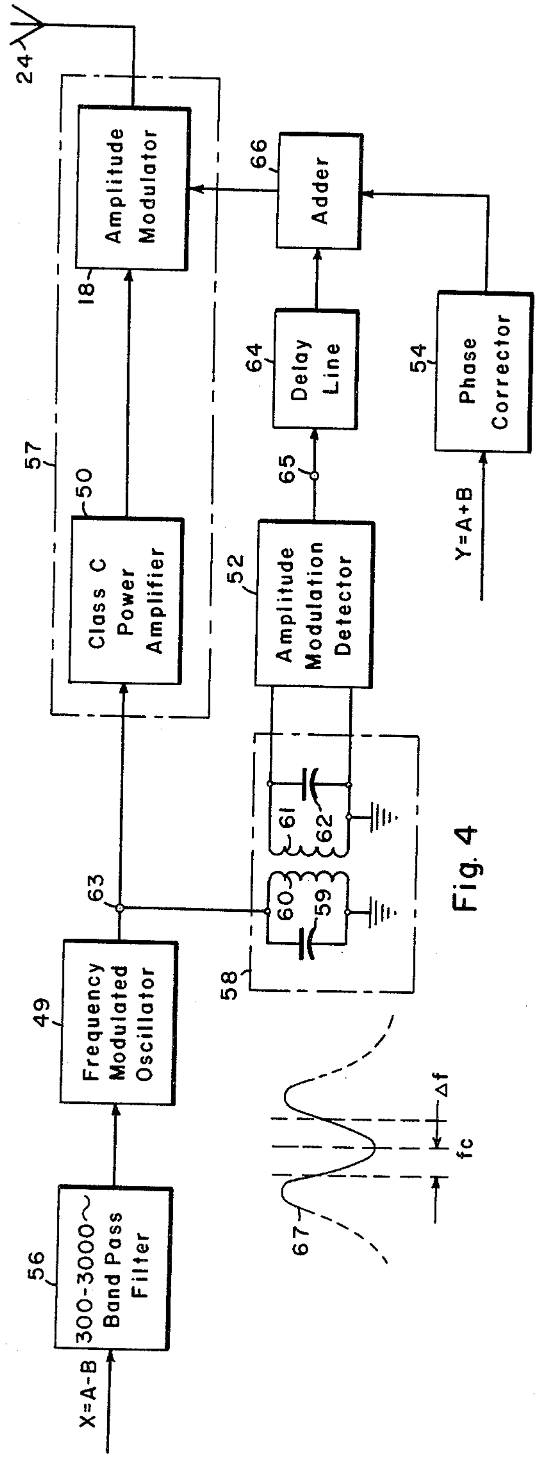
FIG. 4 is a functional block diagram of a further transmitting apparatus arranged in accordnace with the present invention.
Figure 5:
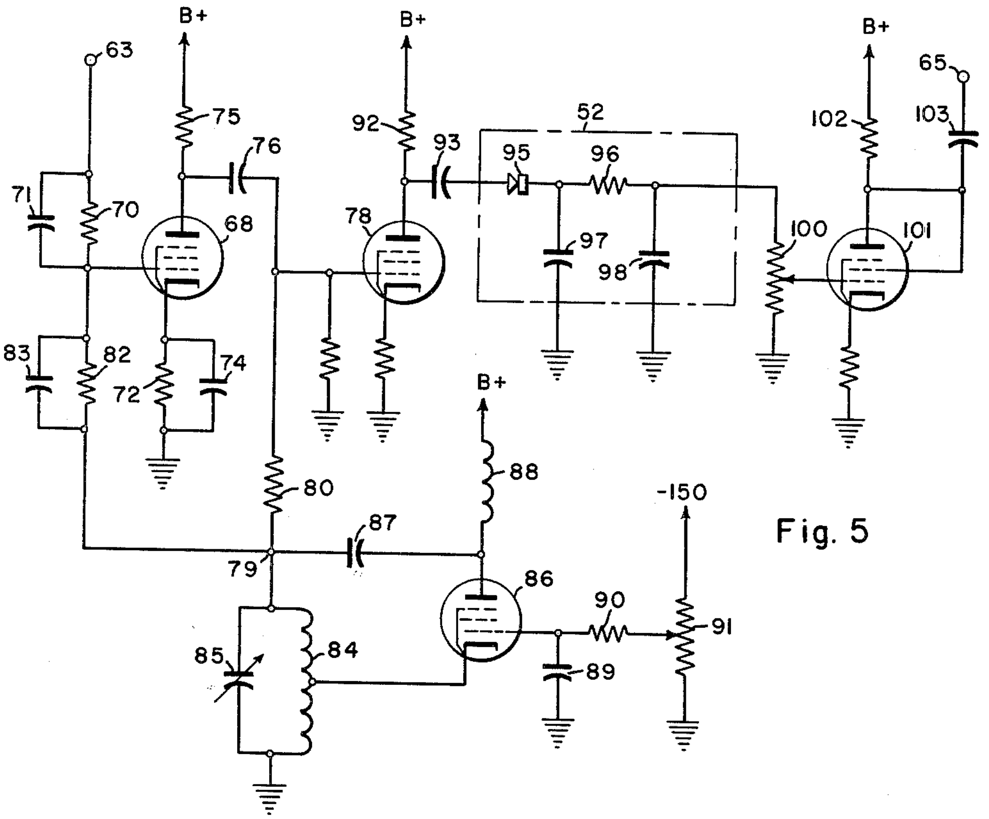
FIG. 5 is a schematic diagram of an additional type of circuit for performing the same functions as certain elements of the transmitters of FIGS. 3 and 4; and, FIGS. 6 and 7 are graphs illustrating certain typical frequency response characteristics useful in explaining the various features of the present invention.
Figure 6:
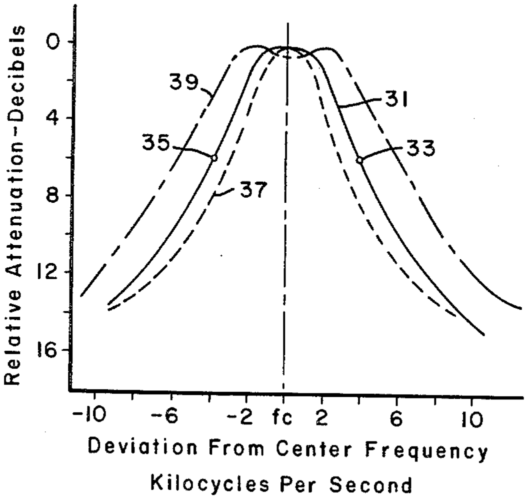

In FIG. 6 there is shown a plurality of curves illustrating the frequency response characteristics of certain conventional AM receiving sets. Curve 31 represents the frequency response characteristic or bandpass characteristic of an average amplitude modulation receiving set having a bandwith of approximately 8 kilocycles between the 6 decibel attenuation points 33 and 35. When a composite signal of the type produced by the circuit system of FIG. 1 is applied to a receiver having the bandpass characteristic as shown by curve 31, the frequency deviations which are a consequence of the stereophonic frequency modulation cause the carrier to sweep back and forth across the curve 31 at least part way between the points 33 and 35. Accordingly, the gain of the receiver will be varied as a function of the frequency deviation and spurious amplitude modulation would be introduced and detected by the conventional AM detector circuit. The spurious amplitude modulation or distortion of the received signal by the receiver passband characteristic may result in cross-talk of the frequency modulating signal X into the amplitude modulating signal Y as the signal Y is reproduced by the amplitude modulation receiver. Under normal conditions, the cross-talk distortion into the amplitude modulation signal Y will be principally second harmonics of the frequency modulating signal X. The notch filter network precorrects for the aforesaid distortion expected in the receiver by providing an amplitude modulation predistortion component substantially corresponding inversely to the distortion expected in an average AM receiver. Such predistortion is accomplished by providing the network 20 with a frequency response characteristic substantially as shown by curve 21 in FIG. 1 or by curve 41 in FIG. 7. From inspection of FIGS. 6 and 7 it may be observed that response curve 41 of the network 20 is substantially the reciprocal of the receiver frequency response curve 31 as shown in FIG. 6. Specific circuit arrangements for providing the network 20 with a frequency response characteristic such as that shown by curve 41 will be described in greater detail hereinafter in connection with the embodiments of the present invention as shown in FIGS. 4 and 5.

Referring now more specifically to FIG. 2 of the accompanying drawing, the reference numeral 26 denotes a conventional receiving antenna for receiving signals transmitted by the apparatus of FIG. 1. Signals intercepted by antenna 26 are applied to a conventional heterodyne converter and intermediate frequency amplifier system denoted by block 28. The received radio frequency signals are converted by converter-amplifier 28 to an intermediate frequency signal having the same modulations as the original carrier signal. The intermediate frequency carrier signal is amplified by and applied from block 28 to an amplitude detector 30 and also to an amplitude limiter 34 both of which are connected to the output circuit of the intermediate frequency amplifier.

A first signal channel of the receiver of FIG. 2 includes conventional amplitude detector 30 and audio amplifier 32 for detecting the amplitude modulation signal Y and supplying that signal to a signal combining matrix 40. A second signal channel, comprising a limiter circuit 34, a frequency modulation detector 36 and an audio amplifier 38 all connected in cascade to the output of the intermediate frequency amplifier, operates to detect the frequency modulation signal X and apply the signal X to a second input of the matrix 40. One signal combining matrixing network of the type suitable for the block 40 of FIG. 2 is disclosed and described in detail in an article entitled "Single Push-Pole for Stereo Channels," published in Radio and Television News, issue of January 1959 at pages 48 and 49. It will be apparent to those skilled in the art that addition and subtraction of signals by means of transformer arrangements as shown in the above-mentioned article is not essential to the present invention. Other arrangements, known per se, utilizing resistance networks or phase inverters and additive amplifier circuits may also be used in the system of the present invention. The signal combining network 40 has first and second output circuits connected respectively to first and second sound reproducing devices 42 and 44. Sound reproducing devices 42 and 44 are shown as comprising a pair of loudspeakers preferably spaced apart in a listening space such as a room of the listener's home. Such spaced loudspeakers will, of course, be used only when the transmitted signals X and Y are respectively the stereophonic and monophonic components of a transmitted stereophonic program material. In accordance with other aspects of the present invention wherein the signals X and Y may be entirely unrelated information signals, the reproducers 42 and 44 may comprise unassociated sound reproducing devices, or information signal recorders of various known types.

The frequency modulation detector circuit 36 may comprise any of various well known frequency discriminator circuits such as, for example, a gated beam detector. Similarly, the limiter 34 and the audio amplifier 38 will be recognized as components similar to those of a conventional FM receiver which serve to demodulate the FM carrier to produce an audio frequency signal which is amplified and fed to the combining circuit 40. The only essential criteria for the second signal channel of the receiver is that the frequency modulation detector 36 should be arranged to demodulate carrier waves of frequencies in the conventional IF band, normally about 456 kc.

Referring now to FIG. 3 of the drawing, microphones A and B are the two spaced microphones of the stereophonic system which microphones may be positioned in spaced relation on the stage on which an orchestra or the like is located. The outputs of microphones A and B are amplified by audio preamplifiers 46*a* and 46*b* respectively and the amplified audio signals are applied to first and second input circuits of a sum and difference matrix 48. Network 48 preferably comprises one of various known arrangements using resistance networks or phase inverters and amplifier circuits for producing a stereophonic difference signal $A-B$ at output terminal 45, and a monophonic sum signal $A+B$ at output terminal 47. The sum signal $A+B$ corresponds to the monophonic sound information which would be heard by a listener seated near the center of the auditorium in which the orchestra is located, and may be considered as corresponding to the first information signal Y from the source 10 of FIG. 1. Similarly, the stereophonic difference signal $A-B$ at terminal 45 may be considered as corresponding to the second information signal X derived from the source 12 of FIG. 1.

The stereophonic difference signal $A-B$ is applied from terminal 45 to the input of a frequency modulated oscillator 49 which preferably comprises a conventional oscillator controlled by a reactance tube circuit. Frequency modulated oscillator 49 is preferably designed to provide a deviation of approximately 3 kilocycles maximum from the carrier center frequency $f_c$ in response to stereophonic difference signals from terminal 45. The frequency modulated carrier is supplied to a notch filter network 20 corresponding to that of FIG. 1. Summation signal $A+B$, from terminal 47, is supplied by way of a phase corrector 54 to a conventional amplitude modulator 18'. It will be understood that the arrangement of terminals 45 and 47 could be reversed with the summation signal $A+B$ being used to modulate the carrier frequency; however, the arrangement as shown in FIG. 3 is preferred when the system of the present invention is used for stereophonic transmission of sound in order that amplitude modulation receivers of conventional type will receive the monophonic signal $A+B$ rather than the difference signal $A-B$. If the terminals 45 and 47 were so reversed the system of FIG. 3 would not be compatible with conventional amplitude modulation broadcasting.

The output signal from notch filter network 20 comprises a frequency modulated carrier signal having an amplitude modulation corresponding to the absolute deviation of the carrier signal instantaneous frequency from its center frequency $f_c$. Such amplitude modulation is produced by the frequency response characteristic of the network 20 as described heretofore with reference to FIG. 1. The carrier signal channel of the transmitter of FIG. 3 further comprises a class "C" amplifier 50, a first amplitude modulator 18, and a second amplitude modulator 18′ connected in cascade between the output of network 20 and a transmitting antenna 24. Individually, these components will be recognized as known components of a conventional amplitude modulation transmitter which here serve to power amplify the frequency modulated carrier signal and to apply amplitude modulation intelligence thereto for radiation by the antenna 24.

High power transmitters of the type exemplified by amplifier 50 and the modulators 18 and 18′ do not, as a general rule, provide a flat frequency response characteristic. Accordingly, it is not desirable to pass the amplitude modulation predistortion component provided by network 20 through the transmitter circuits 50 and 18. The system of FIG. 3 overcomes this problem by the provision of the amplitude modulation detector 52 in the auxiliary signal path extending from network 20 to a second input of the amplitude modulator 18. Since amplifier 50 operates class C, it does not transmit the amplitude modulation predistortion signal but rather translates only a frequency modulated carrier with the frequency modulation corresponding to the $A-B$ signal. The carrier signal from network 20 which is amplitude modulated with the desired predistortion signal is translated by the auxiliary signal path shown diagrammatically as conductor 51 to the input of a conventional amplitude modulation detector 52. The output signal from detector 52 corresponds to the amplitude modulation envelope of the carrier signal from network 20 and is an audio frequency signal corresponding to the desired predistortion correction. Thus, the output from detector 52 as applied to the second input 53 of amplitude modulator 18 constitutes a predistortion control voltage which varies as a function of the absolute frequency deviation and in the usual instance is rich in second harmonics of the stereophonic difference signal $A-B$. Since the distortion control voltage is a positive function of absolute deviation, it will have a maximum value when the difference signal $A-B$ is maximum and will fall to zero when the difference signal is zero.

An outstanding advantage of the compensation system of the present invention when used in a stereophonic sound transmission system of the type shown in FIG. 3 utilizing the $A+B$ and the $A-B$ concept is that the predistortion control voltage will always be zero when the amplitude modulation due to the sum signal $A+B$ is maximum. That characteristic enables high level amplitude modulation of the carrier signal by means of modulator 18′ so that the monophonic sum signal $A+B$ may be transmitted with maximum amplitude modulation. Accordingly, the amplitude modulation sidebands as radiated by antenna 24 will have power levels approaching 50% of the total radiated power, as is the usual case in ordinary AM broadcasting, and the transmitter of FIG. 3 will have substantially the same broadcast range as a conventional monophonic transmitter.

The foregoing advantage will be better understood by a detailed consideration of the characters of the monophonic sum signal $Y=A+B$, and the stereophonic difference signal $X=A-B$. Consider first the case in which the sound at the two microphones is balanced, i.e. equal and in phase. Now, assume that the Y signal amplitude at terminal 47 necessary to produce, for example, 95% amplitude modulation is equal to 1. Since the sound, in this case, is balanced it follows that signal component A is equal to B is equal to 0.5, and the stereophonic difference signal $X=A-B=0$. Thus, when the sound is balanced, the difference signal is zero and the carrier may be safely modulated at levels approaching 100% modulation without danger of overmodulation by the predistortion control signal.

Considering next the case where the sound signal amplitude at microphone A is maximum and the sound signal amplitude at microphone B is also maximum but 180° out of phase with that at microphone A. The difference signal X has a maximum value but the sum signal Y has a minimum value, namely zero. Since the difference signal is a maximum, the predistortion control signal is also a maximum but no danger of overmodulation exists because the sum signal Y is zero.

Reference is now made more specifically to FIG. 4 of the accompanying drawing. FIG. 4 illustrates a transmitter, which is of the general character of that illustrated in FIG. 3 in that a source of first modulation signal $X=A-B$ is utilized to modulate the frequency of the carrier supplied by frequency modulated oscillator 49, and in that a second modulation signal $Y=A+B$ is applied through a phase corrector network 54 for amplitude modulating the carrier wave by means of an amplitude modulator 18. The system of FIG. 4 differs in that the output of the frequency modulated oscillator 49 is applied directly to a class C power amplifier 50 and then to the amplitude modulator 18 rather than being applied through the notch filter network 20 as in FIG. 3. The system of FIG. 4 is preferable to those of FIGS. 1 and 3 in that the expensive high power level components of the system of FIG. 4 may be identical to those of a conventional amplitude modulation transmitting station. In FIG. 4 the dotted block 57 designates the high power level section of the transmitter for applying power to the radiating antenna 24. Block 57 incorporates the usual class C power amplifier 50 and the usual amplitude modulator stage 18. The frequency modulated carrier signal from oscillator 49 is applied by way of a terminal 63 directly to the input circuit of class C amplifier 50, and the frequency modulator carrier signal, without amplitude modulation is applied from amplifier 50 to the carrier signal input circuit of the amplitude modulator 18.

In addition, the system of FIG. 4 incorporates a bandpass filter network 56 connected between the source of stereophonic difference signal $X=A-B$ and the input to the frequency modulating oscillator 49. Listening tests using both earphones and speakers have indicated that there is little stereophonic information detectable by the listener in audio signals below about 300 cycles per second. Consequently, the stereophonic difference signal $A-B$ will be of extremely small amplitude when the frequencies of the signal are below about 300 cycles per second. Further, it has been found, by appropriate tests that excellent stereo effect is produced when audio frequencies above 3000 cycles per second are present in the monophonic channel only. Thus, very little improvement in stereo effect would be achieved by transmitting the signals below approximately 300 cycles per second or the signals above approximately 3000 cycles per second. In a preferred embodiment of the present invention, the bandpass filter 56 may comprise a conventional resistance-capacitance filter network having a bandpass characteristic extending from 300 cycles to 3000 cycles between the 3 decibel attenuation points. The filter cutoff rate, outside the desired bandpass, preferably should be approximately 6 decibels per octave.

In the system of FIG. 4 the bandpass filter 56, the modulated oscillator 49, amplifier 50 and modulator 18 comprise the frequency modulation channel of the transmitter. The predistortion control voltage generating system of FIG. 4 comprises a notch filter network 58 connected in cascade with a conventional amplitude modulation detector 52 and a phase correcting delay line 64 to a first input of an adder circuit 66. The particular notch filter network used in the embodiment of FIG. 4 comprises a double-tuned, over-coupled radio frequency transformer having a primary winding 60 which is shunted by a tuning capacitor 59 and having a secondary winding 61 which is shunted by a tuning capacitor 62. One end of primary winding 60 is coupled to output terminal 63 of the frequency modulated oscillator 49. The other end of winding 60 is connected to ground or to a point of reference potential. One end of secondary winding 61 is connected to the same point of reference potential and the other end is coupled to the input circuit of the detector 52. The notch filter 58 should have a bandpass characteristic substantially as shown by the curve 67 at the left of the network 58 in FIG. 4. As shown by curve 67, the double-tuned, over-coupled transformer network has a reentrant notch in its center portion, so that the frequency modulated carrier signal from terminal 63 will be relatively more attenuated when its instantaneous frequency is near the center frequency $f_c$ than when near the points of maximum frequency deviation $\Delta f$. Preferably the curve 67 of network 58 should be substantially identical to the curve 41 of FIG. 7 between the 4 decibel attenuation points. Filter 58 comprising the over-coupled double-tuned transformer will be recognized as a structure known per se to those skilled in the art. The design of such bandpass filter networks is described in full in Terman, "Radio Engineers Handbook," section 3, paragraph 9, first edition, 1943. Thus, the bandpass frequency response characteristics of the network 58 is substantially inverse to that of an average monophonic AM receiver as exemplified by the curve 31 in FIG. 6. Accordingly, the network 58 has substantially the same function as the notch filter network 20 of FIG. 1 and produces at its output a frequency modulated carrier wave which is amplitude modulated as a direct function of the frequency deviation. That amplitude modulation is detected by the conventional detector 52 and provides an audio frequency distortion control voltage at terminal 65 which control voltage is substantially the same as that described in detail as being applied to terminal 53 in FIG. 3. The predistortion control signal from terminal 65 is applied, through a phase correcting delay line 64, to a first input of an adder circuit 66. Simultaneously, the monophonic sum signal $Y=A+B$ is applied through phase corrector 54 to a second input of the adder circuit 66. The phase correctors 54 and 64 provide appropriate phase shift or delay of the respective signals so that the $A+B$ amplitude modulation of the carrier will have the proper phase relationship to the $A-B$ frequency modulation thereof, and so that the predistortion control signal will provide the maximum predistortion modulating effect in synchronism with the maximum frequency deviations of the frequency modulated carrier. Thus, any phase difference arising from the difference in the channels traversed by the monophonic signal Y and the stereophonic signal X is taken care of in the transmitter, and no phase correction is required in the receiver of FIG. 2. Adder circuit 66 combines the monophonic signal Y with the predistortion control signal to provide a predistorted amplitude modulating signal which is applied from the output of adder 66 to a second input of amplitude modulator 18 to modulate the amplitude of the carrier wave. Accordingly, the carrier wave at the output of modulator 18, and as radiated from antenna 24, includes predistorted amplitude modulation with the predistortion being sufficient so that the distortion occurring in an ordinary AM receiving set is counteracted by the predistortion. Accordingly, persons having ordinary amplitude modulation receiving sets may receive the monophonic signal Y independently of and without interference from the stereophonic signal X which is simultaneously transmitted on the same carrier by frequency modulation.

Although notch filter network 58, as shown in FIG. 4, will provide an entirely satisfactory predistortion control signal when properly designed, the invention is not dependent upon the use of the double-tuned over-coupled transformer arrangement. The same advantages of the present invention and the same predistortion control signal may be obtained by a circuit such as that shown in FIG. 5. In certain application, the circuit of FIG. 5 may be preferable to that of FIG. 4 in that the circuit of FIG. 4 requires transformer coils of relatively high Q in order to give the proper bandpass frequency response characteristic. Also, difficulty may be encountered in providing adjustability of the frequency response characteristic of the filter 58. The circuit of FIG. 5 provides a notch filter network of adjustable Q so that the width of the bandpass notch may be adjusted and further provides adjustment of the predistortion control signal amplitude so that the effective depth of the bandpass notch is controllable.

As shown in FIG. 5 the notch filter network comprises radio frequency amplifier tubes 68 and 78 connected in cascade with frequency modulated carrier signal from the frequency modulated oscillator being applied by way of terminal 63 and through resistor 70 shunted by capacitor 71 to the grid of the tube 68. The cathode of the conventional pentode 68 is connected to ground or a point of reference potential by cathode bias resistor 72 shunted by capacitor 74. The anode of tube 68 is connected to a source of energizing potential B+ through a plate load resistor 75 and is further connected to the grid electrode of conventional pentode 78 through a coupling capacitor 76. The screen grids of pentode 68 and 78 may of course be provided with the proper operating potential by means of conventional circuitry which has been omitted for simplicity.

Figure 7:
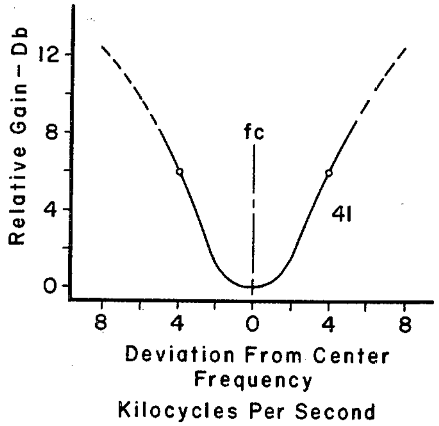

To provide the desired frequency response characteristic substantially as shown by curve 41 in FIG. 7, the amplifier 68 is provided with a degenerative feedback circuit including resistors 80 and 82 connected serially between capacitor 76 and the grid of tube 68, with resistor 82 being shunted by capacitor 83, and with a single tuned circuit, comprising radio frequency inductor 84 shunted by a variable capacitor 85, connected from the junction of resistors 80 and 82 to ground. A so-called "Q-multiplier" circuit comprising a conventional pentode discharge device 86 is coupled across a portion of the inductor 84 by means of coupling capacitor 87 and connection of the cathode to an intermediate terminal of inductor 84. Tube 86 and its associated circuitry operate as a negative resistance across the tuned circuit 84 and 85, thereby increasing the effective Q of the coil 84 and enabling a notch of any desired sharpness to be formed in the passband characteristic of the cascade amplifiers 68 and 78. The cathode of tube 86 is returned to ground through a portion of inductor 84. The anode is supplied with energizing potential from a conventional source of B+ through a load inductor 88. The grid of tube 86 is bypassed to ground by capacitor 89 and is connected through a current limiting resistor 90 to the variable tap of a potentiometer 91 the ends of which are connected respectively to ground and to a source of negative biasing potential. Adjustment of potentiometer 91 changes the bias on the grid of tube 86, thereby varying the gain of tube 86 and effectively varying the value of negative resistance supplied across the coil 84 by the Q-multiplier circuit.

Resistor 80 and tuned tank 84, 85 constitute an RF voltage divider extending from the output circuit of tube 68 to ground. Intermediate terminal 79 of the voltage divider is connected through resistor 82 to the grid of tube 68. Thus, the amount of degenerative feedback applied through resistor 82 to the grid of tube 68 will vary as the function of the effective impedance from terminal 79 to ground. The tank circuit 84, 85 is tuned to the center frequency $f_c$ of the carrier wave. Accordingly, when the carrier wave translated by tube 68 is near the carrier center frequency $f_c$ the tank circuit 84, 85 will exhibit a maximum impedance and a maximum amount of negative feedback voltage will be applied through resistor 82 to the grid of the tube 68. Accordingly, the gain of amplifier 68 will be at a minimum when the carrier wave applied to terminal 63 is at the center frequency $f_c$.

When the carrier wave instantaneous frequency deviates from the center frequency $f_c$, in response to increase in the absolute value of the stereophonic difference signal $A-B$, the tank circuit 84—85 will exhibit a lesser impedance to the off center carrier wave frequency, and accordingly a lesser amount of negative feedback voltage will be applied from terminal 79 through resistor 82 to the input of tube 68. Thus, the effective gain of the radio frequency amplifier circuit comprising tubes 68 and 78 varies substantially as shown by curve 41 in FIG. 7, and corresponds inversely to the amplitude frequency response characteristic of an average receiver as represented by the curve 31 in FIG. 6. Such inverse correspondence should hold true at least between the 4 decibel points of curve 41. The portions of curve 41 corresponding to excessive deviation from the center frequency $f_c$ are shown dotted to indicate that the frequency response characteristic in such regions is not of particular importance.

From the foregoing it will be apparent that the frequency modulated carrier signal output from tube 78, as developed across anode load resistor 92, has an amplitude envelope which varies as an absolute function of the frequency deviation of the carrier signal from the center frequency $f_c$. The anode of tube 78 is coupled through capacitor 93 to the input circuit of a conventional amplitude modulation detector 52 comprising rectifier device 95 and a pi filter network including resistor 96 and capacitors 97 and 98. Detector circuit 52 demodulates the carrier signal to produce across output capacitor 98 a distortion control voltage corresponding to the envelope amplitude of the frequency modulated carrier signal. Thus, the distortion control voltage appearing at the output of detector 52 varies as a function of the absolute carrier frequency deviation and inversely as the distortion expected in an average AM receiver.

A potentiometer 100 is connected from the output terminal 52 to ground, with the variable tap being connected to the control electrode of predistortion control signal amplifier tube 101. Adjustment of potentiometer 100 provides adjustment of the predistortion control signal amplitude, thereby providing effective control of the notch depth in the response characteristic of the notch filter network. The anode of tube 100 is connected to a source of B+ by a load resistor 102 and is further connected through a coupling capacitor 103 to the output terminal 65 which corresponds to the terminal 65 of FIG. 4. Accordingly the circuit of FIG. 5 provides, at terminal 65, a predistortion control signal which varies as a function of the absolute carrier frequency deviation and which corresponds to the similar signal applied to the terminal 65 in the system of FIG. 4.

From inspection of curve 31 in FIG. 6 and 41 in FIG. 7, it will be appreciated that the distortion precompensation systems of the present invention provide predistortion of the amplitude modulation substantially corresponding inversely to the distortion expected in a conventional amplitude modulation receiver. Such precompensation of the radiated signal enables greater carrier frequency deviation for a given level of cross talk of the FM signal into the AM reception.

The frequency selective network of a conventional AM receiver exhibits approximately 8 kilocycles band-width between the 6 decibel attenuation points 35 and 33 as shown by curve 31 in FIG. 6. However, all amplitude modulation receivers do not have the same frequency response characteristic. Some may have a narrower frequency response characteristic such as exemplified by curve 37. Others may have an unusually wide frequency response characteristic as illustrated by curve 39 which indicates a bandwidth of approximately 12 kilocycles between the 6 decibel attenuation points. Accordingly, it is not possible to completely and exactly precompensate the radiated carrier signal for the distortion expected in all receivers. However, the following calculations show that a precompensation system having substantially the frequency response characteristic shown by the curve 41 in FIG. 7 will partially compensate for the distortion expected in receivers having either wider or narrower than average bandwidths, whereby the cross-talk occurring in such receivers is kept at reasonably tolerable levels.

An approximate formula for the relative gain of a receiver having a frequency response characteristic substantially corresponding to the same characteristic of a high "Q" single tuned circuit is:

$$\text{Relative gain}=\frac{1}{\sqrt{1+\left(\frac{\Delta f}{\Delta f_3}\right)^2}} \qquad (1)$$

where $\Delta f$ is frequency departure from center frequency, and $\Delta f_3$ is frequency departure of 3 db point from center frequency, or $$\frac{1}{\sqrt{1+3\left(\frac{\Delta f}{\Delta f_6}\right)^2}} \qquad (2)$$

where $\Delta f$ is frequency departure from center frequency, and $\Delta f_6$ is frequency departure of 6 db point from center frequency.

Since such an average amplitude modulation radio receiver has a bandwidth of approximately 8 kilocycles at the 6 decibel attenuation points, $\Delta f_6$ of Equation 2 will be equal to 4 kilocycles and the change in amplitude of a signal in response to a deviation of 3 kilocycles will be approximately:

$$\frac{1}{\sqrt{1+3\left(\frac{3}{4}\right)^2}}=\frac{1}{\sqrt{2.69}}=.61 \qquad (3)$$

Thus, the amplitude of a received signal will vary from 100% at center frequency to approximately 61% at 3 kilocycle peak deviation. That corresponds to a spurious amplitude modulation resulting from the frequency modulation of 24.2%.

That is;

$$\frac{1-.61}{1+.61}=24.2\% \qquad (4)$$

A narrower than normal bandwidth receiver such as exemplified by curve 37 in FIG. 6 and having a bandwidth of approximately 6 kilocycles between the 6 db attenuation points may be analyzed by similar calculation. The 6 kilocycle bandwidth will vary the amplitude of a frequency modulation signal from:

$$\frac{1}{\sqrt{1+3\left(\frac{3}{3}\right)^2}}=0.5$$

at the 3 kilocycle deviation point, to 100% at the center frequency $f_c$. That amount of spurious amplitude modulation represents an amplitude modulation of 33%.

Similar calculation for a receiver having a wider than normal bandpass characteristic such as that exemplified by curve 39 in FIG. 6 shows that the 12 kilocycle bandwidth produces a relative gain of:

$$\frac{1}{\sqrt{1+3\left(\frac{3}{6}\right)^2}}=0.755$$

or from a full amplitude of 1.0 at the center frequency $f_c$, to 0.755 amplitude at the 3 kilocycle deviation points. That spurious change in the output amplitude of the carrier wave corresponds to an amplitude modulation of 14%.

That is;

$$\frac{1-.755}{1+.755}=14\%$$

If the precompensation system is used in the transmitter having a frequency response characteristic substantially as shown by curve 41 of FIG. 7, the average amplitude modulation receiver exemplified by curve 31 of FIG. 6 and Equations 3 and 4 will be perfectly compensated since the predistortion control signal will boost the amplitude modulation of the carrier as transmitted by a factor of $$\frac{1}{0.61}$$

at the times of peak deviation of the carrier wave from the center frequency $f_c$.

When the so boosted signal is received by a receiver having a narrower than average bandwidth such as the 6 kilocycle bandwidth exemplified by curve 37 of FIG. 6, the IF carrier wave at the receiver second detector will contain spurious amplitude modulation which is distorted by a factor of 0.5, and is precorrected by a factor of $$\frac{1}{0.61}$$

Thus, the output variation will be:

$$\frac{.5}{.61}=0.82$$

Thus, the output will vary from 0.82 to 1.0 and the actual distortion produced by such a receiver responding to the precompensated signal will be:

$$\frac{1-.82}{1.82}=9.9\%$$

Thus, the actual distortion in such a receiver is only 9.9% as compared to 33% resulting from an uncompensated frequency modulated signal.

A 12 kilocycle bandwidth AM receiver exemplified by curve 39 in FIG. 6 will be overcompensated and amplitude will vary from:

$$\frac{.74}{.61}=1.21$$

at maximum deviation, to 1.0, or an amplitude modulation of:

$$\frac{1.21-1.0}{2.21}=9.5\%$$

Thus, the compensation provided at the transmitter reduces the distortion caused by such a receiver from 14% to 9½%.

It will, of course, be appreciated that practically all the receivers have passbands closely corresponding to average bandwidth as shown by curve 31, and that the curves 37 and 39 exemplify extreme examples which occasionally might be encountered. Consequently, the compensation provided by the transmission of the system of the present invention will be correspondingly better in most receivers. It will be noted that the precompensation provided by the systems of the present invention not only reduces distortion in the output of an ordinary amplitude modulation receiver which is being used to listen monophonically, but also enables the use of standard and economical circuits for the frequency selective portion of a stereophonic receiver such as that shown in FIG. 2.

The embodiments of the present invention as shown in FIGS. 4 and 5 are believed to be particularly advantageous in that they may be constructed by addition of auxiliary components to existing broadcast band amplitude modulation transmitters. More specifically, the expensive, high powered class C amplifier and amplitude modulator are already pre-existing in ordinary amplitude modulation transmitters. Such a pre-existing transmitter may be converted to the system of FIG. 4 simply by addition of the relatively inexpensive components necessary to frequency modulate the carrier and to provide the predistortion control voltage for modifying the amplitude modulation.

The dual channel stereophonic receiver, illustrated herein at FIG. 2 of the accompanying drawing, may correspond in circuit detail to the receiver of concurrently filed application for U.S. patent, Serial No. 808,037, filed April 22, 1959, entitled "Broadcast Stereo Receiver," which is assigned to the same assignee as that of the present invention. In general, any techniques there described for reception of the signals as transmitted by the systems of the present invention may be utilized in the system shown in FIG. 2 of the accompanying drawing.

While the present invention has been described with reference to various specific embodiments only, it will be obvious to those skilled in the art that it is not so limited but is susceptible of various changes and modifications without departing from the spirit and scope thereof.

We claim as our invention:

1. A multiplex communication system comprising means to generate radio frequency oscillation waves, means to frequency modulate said waves in accordance with one signal, means to amplitude modulate said waves in accordance with another signal, the frequency deviation produced by said frequency modulation means being greater than the linear region of the amplitude-frequency response characteristic of an ordinary radio receiver so that said response characteristic causes distortion of the amplitude modulation, and means coupled to said amplitude modulating means for predistorting said amplitude modulation as a function of said frequency deviation and substantially inversely in accordance with the distortion expected at the receiver, whereby the signal corresponding to the amplitude modulation will be detectable in an ordinary receiver without substantial interference from the frequency modulation.

2. In a multiplex communications system a source of intelligence bearing first signal; a source of intelligence bearing second signal; means responsive to said first signal for generating a frequency modulated carrier having a predetermined center frequency and frequency deviations continuously substantially proportional to said first signal, with said frequency deviations being of such magnitude that the frequency response characteristic of an ordinary broadcast band amplitude modulation receiver generates an undesired amplitude modulation distortion in response to said carrier; amplitude modulation means to modulate the envelope of said carrier in accordance with said second signal; and means including a notch filter network responsive to said frequency deviations coupled to said amplitude modulation means to predistort said envelope in accordance with said frequency deviations and substantially inversely in proportion to said undesired amplitude modulation distortion, whereby said second signal will be reproducible in an ordinary amplitude modulation receiver without interference from said frequency modulation and said first signal will be reproducible in a frequency discriminating receiver tuned to said predetermined center frequency.

3. In a communications system, a source of first modulation signal, a source of second modulation signal, means responsive to said first modulation signal for generating a frequency modulated carrier having a predetermined center frequency and frequency deviations continuously substantially proportional to said first modulation signal; means to amplitude modulate said frequency modulated carrier in proportion to said second modulation signal; means responsive to said frequency modulated carrier for generating a predistortion control signal which varies as a function of said frequency deviations; and means for utilizing said predistortion control signal to further amplitude modulate said carrier whereby the amplitude modulation of said carrier is predistorted substantially inversely in accordance with the amplitude-frequency distortion expected to occur in receiving said carrier in a conventional amplitude modulation receiver, and means for transmitting said frequency and amplitude modulated carrier.

4. In a multiplex communications system, a source of intelligence bearing first signal, a source of intelligence bearing second signal, means responsive to said first signal for generating a frequency modulated carrier having a predetermined center frequency and frequency deviations continuously substantially proportional to said first signal, with said frequency deviations extending over a frequency range which exceeds the linear amplitude-frequency response range of conventional broadcast band amplitude modulation receivers; means responsive to said carrier for generating a predistortion control voltage which varies continuously as a function of the carrier frequency deviation from said center frequency; means responsive to said second signal for amplitude modulating said carrier substantially in accordance with said second signal; and means responsive to said predistortion control voltage for adding an amplitude modulation component corresponding inversely to the amplitude-frequency distortion expected at said receivers, whereby said second signal will be reproduced in conventional amplitude modulation receivers without crosstalk from the frequency modulation.

5. Apparatus for stereophonic transmission of sound on a single carrier comprising first and second sound sources, means to add the outputs of said sources to obtain a sum signal, means to subtract the said outputs to obtain a difference signal, means for generating a carrier having a predetermined center frequency, means for frequency modulating said carrier as a function of said difference signal, means responsive to the frequency modulated carrier for producing a distortion precorrection signal which varies as a function of the frequency deviation of said frequency modulated carrier from said center frequency; transmitter apparatus for radiating said carrier including means for continuously modulating the radiated carrier energy; and means for concurrently applying said sum signal and said correction signal to control said carrier energy modulating means so that the radiated carrier energy varies as a composite function of said sum signal and said precorrection signal and includes an amplitude modulation precorrection component opposite and complementary to the amplitude-frequency distortion which will occur in a conventional amplitude modulation receiver responding to said radiated carrier energy.

6. In a stereophonic radio system wherein first and second sound signals are transmitted as separate modulations of a common carrier; transmitter apparatus comprising means for generating a carrier having a predetermined center frequency, means to modulate the frequency of said carrier in accordance with said first signal, means including a notch filter network responsive to the frequency modulated carrier for developing a control signal representative of the absolute difference between said center frequency and the instantaneous frequency of said modulated carrier, means to provide amplitude modulation of said frequency modulated wave in accordance with said second signal, means to modify said amplitude modulation in accordance with said control signal, and an antenna system for radiating the amplitude and frequency modulated carrier wave; radio receiver means comprising first and second channels having an amplitude detector and a frequency detector respectively, said amplitude detector yielding said second signal and said frequency detector said first signal, said receiver means further including a frequency selective network with said amplitude detector being coupled to the output of said selective network, said selective network having a non-linear frequency response characteristic over the range of frequency deviations of said modulated carrier, said notch filter network having a non-linear transfer characteristic substantially corresponding inversely to the characteristic of said selective network over said range of frequency deviations, and means coupled to said detectors for separately reproducing said first and second sound signals.

7. In a multiplex communications system, a source of intelligence bearing first signal, a source of intelligence bearing second signal, means responsive to said first signal for generating a frequency modulated carrier having a predetermined center frequency and frequency deviation continuously varying substantially as a function of said first signal, amplitude modulation means to modulate the envelope of said carrier in accordance with said second signal, means including a notch filter network responsive to said frequency deviation coupled to said amplitude modulation means to predistort said envelope in accordance with said frequency deviations, and means for transmitting said frequency and amplitude modulated carrier; radio receiving means responsive to said carrier at a remote location, said receiving means comprising a frequency selective network and first and second channels and respectively including amplitude demodulation means and frequency demodulation means for responding to carrier signals translated by said network to reproduce said first and second intelligence bearing signals respectively, said frequency selective network having an amplitude-frequency response characteristic which is non-linear over the range of said frequency deviations, and said notch filter network having a non-linear transfer characteristic substantially corresponding inversely to said response characteristic over said range of frequency deviations, whereby the amplitude modulation predistortion introduced by said notch filter network substantially counteracts the amplitude distortion introduced by said frequency selective network so that said amplitude demodulation means reproduces said second signal without substantial crosstalk interference from said frequency modulation.

8. In a multiplex communication system wherein first and second signals are transmitted and received respectively as frequency and amplitude modulations of a common carrier; transmitting apparatus comprising a source of sound representative signal A, a source of sound representative signal B, difference producing means for combining the signals A and B to produce a difference signal $A-B$, sum producing means for combining the signals A and B to provide a sum signal $A+B$, means responsive to said difference signal $A-B$ for generating a frequency modulated carrier having a predetermined center frequency and frequency deviations continuously varying substantially as a function of said difference signal, means including a notch filter network responsive to said frequency modulated carrier for producing a carrier wave having an amplitude modulation envelope which varies as a function of the absolute difference between said center frequency and the instantaneous frequency of said frequency modulated carrier, amplitude demodulation means coupled to said notch filter network and responsive to said carrier wave to produce a distortion precorrection signal which varies as a function of the frequency deviation of said frequency modulated carrier from said center frequency, circuit means coupled to said sum producing means and to said demodulation means for additively combining said sum signal $A+B$ with said distortion precorrection signal to produce a predistorted modulation signal, amplitude modulation means coupled to said carrier generating means and responsive to said predistorted modulation signal for modulating the envelope of said carrier, and means for transmitting said frequency and amplitude modulated carrier, remotely located radio receiving means responsive to said transmitted carrier comprising a frequency selective network having an amplitude-frequency response characteristic which is non-linear over the range of frequency deviations of said carrier, first and second signal channels respectively including amplitude demodulation means and frequency demodulation means respectively responsive to carrier signals translated by said frequency selective network to reproduce respectively said sum signal and said difference signal, said notch filter network having a non-linear transfer characteristic substantially corresponding inversely to said receiver response characteristic over said range of carrier frequency deviation, whereby the amplitude modulation predistortion introduced by said distortion precorrection signal substantially counteracts the amplitude distortion introduced by said receiver response characteristic so that said amplitude demodulation means reproduces said sum signal without substantial frequency intermodulation distortion, a sum producer and a difference producer coupled in common to said first and second signal channels and each responsive to said sum signal $A+B$ and said difference signal $A-B$ to recover respectively said sound representative signals A and B.

9. In a multiplex communicaitons system, a source of intelligence bearing first signal, a source of intelligence bearing second signal, means responsive to said first signal for generating a frequency modulated carrier having a predetermined center frequency and frequency deviation continuously varying substantially as a function of said first signal, amplitude modulation means to modulate the envelope of said carrier in accordance with said second signal, means including a notch filter network responsive to said frequency deviation coupled to said amplitude modulation means to predistort said envelope in accordance with said frequency deviations, and means for transmitting said frequency and amplitude modulated carrier; signal receiving means responsive to said carrier comprising a frequency selective network, amplitude demodulation means responsive to carrier signals translated by said network for reproducing said second signal, said frequency selective network having a frequency response characteristic which is nonlinear over the range of said frequency deviations and said notch filter network having a nonlinear transfer characteristic corresponding inversely to said response characteristic.

10. In combination in a system for transmitting first and second signals as separate modulations of a single carrier; means for generating a carrier having a predetermined center frequency, means for modulating the frequency of said carrier in accordance with said first signal, filter means having a nonlinear frequency response characteristic for developing a control signal which varies as a predetermined function of the difference between said center frequency and the instantaneous frequency of the frequency modulated carrier, means for amplitude modulating said carrier in accordance with said second signal, means for modifying said amplitude modulation of said carrier in accordance with said control signal and means for transmitting the amplitude and frequency modulated carrier; signal receiving means responsive to said modulated carrier for reproducing at least said second signal, said receiving means comprising a frequency selective network having a frequency response characteristic which is nonlinear over the range of frequency deviations of said modulated carrier, with the frequency response characteristic of said selective network being inversely related to the response characteristic of said filter means.

References Cited in the file of this patent

UNITED STATES PATENTS

| | | |
|---|---|---|
| 2,070,666 | Llewellyn | Feb. 16, 1937 |
| 2,383,847 | Crosby | Aug. 28, 1945 |
| 2,566,698 | Fredendall | Sept. 4, 1951 |
| 2,698,379 | Boelens et al. | Dec. 28, 1954 |
| 2,912,492 | Haantjes et al. | Nov. 10, 1959 |

OTHER REFERENCES

Electronics, February 1941, pages 34–36, "Binaural Transmission on a Single Channel," Eastman et al.